(12) United States Patent
Ling

(10) Patent No.: US 7,768,687 B2
(45) Date of Patent: Aug. 3, 2010

(54) PHOTOELASTIC MODULATOR

(75) Inventor: William Pui Ling, Glen Waverley (AU)

(73) Assignee: Endeavour Instruments Pty. Ltd (AU)

( * ) Notice: Subject to any disclaimer, the term of this patent is extended or adjusted under 35 U.S.C. 154(b) by 12 days.

(21) Appl. No.: 12/162,700

(22) PCT Filed: Jan. 30, 2007

(86) PCT No.: PCT/AU2007/000079

§ 371 (c)(1),
(2), (4) Date: Jul. 30, 2008

(87) PCT Pub. No.: WO2007/087670

PCT Pub. Date: Aug. 9, 2007

(65) Prior Publication Data

US 2009/0015900 A1    Jan. 15, 2009

(30) Foreign Application Priority Data

Jan. 31, 2006    (AU) ............................... 2006900445

(51) Int. Cl.
*G02F 1/01* (2006.01)
*G02F 1/11* (2006.01)
*G02F 1/33* (2006.01)

(52) U.S. Cl. ............ 359/240; 359/299; 359/305; 359/311; 359/285; 359/286; 372/27; 398/183; 250/227.14; 250/227.21; 356/364; 356/365

(58) Field of Classification Search ......... 359/237–240, 359/299, 301, 304, 305, 309–312, 285–287; 372/10, 13, 20, 24, 27, 28, 18, 37, 94, 98, 372/44.01; 398/170, 183; 356/364–367
See application file for complete search history.

(56) References Cited

U.S. PATENT DOCUMENTS

| | | | | |
|---|---|---|---|---|
| 3,330,956 A | * | 7/1967 | Wade | 359/286 |
| 3,365,581 A | * | 1/1968 | Tell et al. | 398/183 |
| 3,379,887 A | * | 4/1968 | Stephany | 398/170 |
| 3,509,453 A | * | 4/1970 | Wilmotte | 324/76.33 |
| 3,517,332 A | * | 6/1970 | De Maria | 372/28 |

(Continued)

FOREIGN PATENT DOCUMENTS

WO    86/06505 A1    11/1986

(Continued)

OTHER PUBLICATIONS

International Search Report for PCT/AU2007/000079, Mar. 12, 2007.

(Continued)

*Primary Examiner*—Loha Ben
(74) *Attorney, Agent, or Firm*—Brooks Kushman PC

(57) ABSTRACT

A photoelastic modulator, comprising a driving block and a driver transducer for perturbing said block in a predefined direction to establish a standing wave extending longitudinally in said block and hence perpendicularly to said predefined direction. The transducer is affixed to said block at two regions of the transducer mutually displaced in said predefined direction, to minimize the coupling of lateral perturbation perpendicular to the predefined direction. A recess or gap may be provided under the transducer.

18 Claims, 6 Drawing Sheets

U.S. PATENT DOCUMENTS 4,687,905 A * 8/1987 Cunningham et al. ....... 392/498
4,718,766 A * 1/1988 Greenstein ................... 356/472
4,845,719 A * 7/1989 Kitahara ....................... 372/26
4,897,541 A * 1/1990 Phillips ................... 250/227.21
5,886,810 A * 3/1999 Siahpoushan et al. ....... 359/285

FOREIGN PATENT DOCUMENTS

| WO | 99/47966 A1 | 9/1999 |
| WO | 01/09670 A1 | 2/2001 |
| WO | 2006/079168 A1 | 8/2006 |

OTHER PUBLICATIONS

Kemp, Piezo-Optical Birefringence Modulators: New Use for a Long-Known Effect, Aug. 1969, Part 1, Journal of the Optical Society of America, vol. 59, No. 8, pp. 950-954.

Candit & Bandoz, New Design for a Photoelastic Modulator, Feb. 15, 1983, Applied Optics, vol. 22, No. 4, pp. 592-594.

* cited by examiner

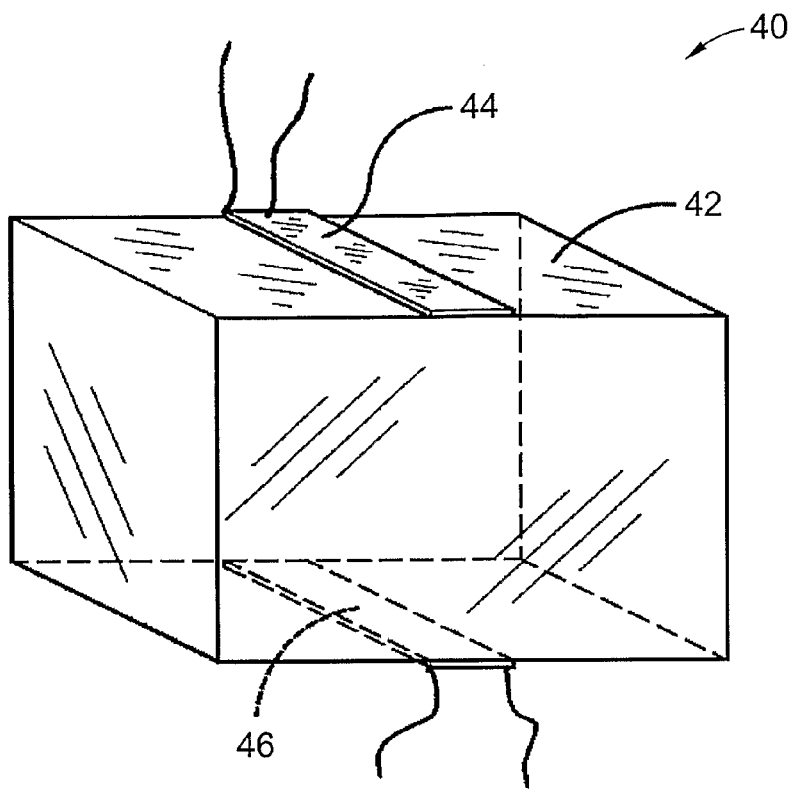
Figure 4
(background art)
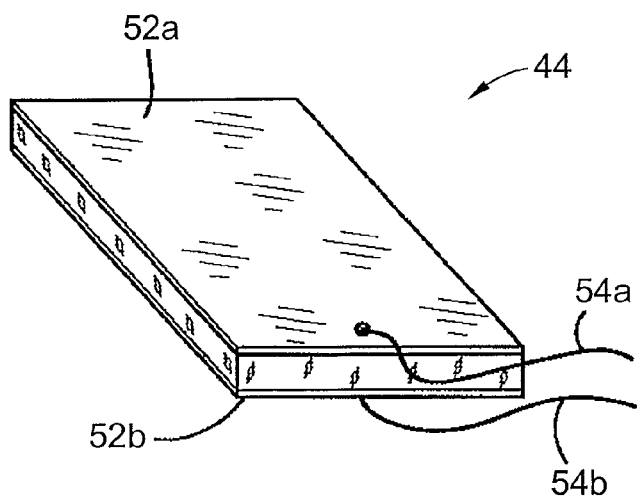 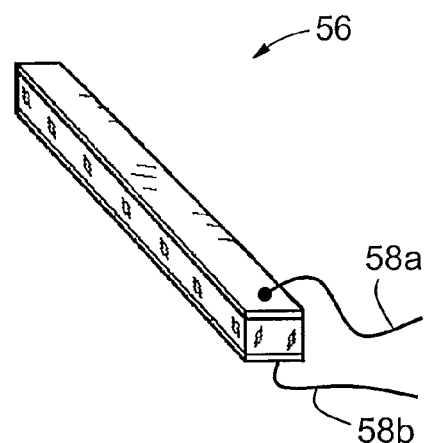
Figure 5A
(background art)
Figure 5B
(background art)

PHOTOELASTIC MODULATOR

RELATED APPLICATION

This application is based on and claims the benefit of the filing date of AU application no. 2006900445 filed 31 Jan. 2006, the content of which is incorporated herein by reference in its entirety.

FIELD OF THE INVENTION

The present invention relates to the fields of spectroscopy and spectropolarimetry. Specifically, the invention relates to a photoelastic modulator, for use most particularly in polarised light measurements and the phase modulation of light.

BACKGROUND OF THE INVENTION

A photoelastic modulator (PEM) is an optical device for the modulation of polarisation or phase modulation of light. PEMs exploit the photoelastic effect, whereby an optical element exhibits birefringence—that is, the refractive index of the element is different for different components of polarised light—that is proportional to the amount of strain (and hence deformation) induced in the element.

The modern PEM was invented in 1969 by J. C. Kemp (J. C. Kemp, Journal of the Optical Society of America, 59 (1969) 950-954), whose basic design has been used in most polarisation related spectroscopy ever since. The Kemp design has the advantage that a pure longitudinal standing wave leads to near pure polarisation in the desired direction. FIG. 1 is a view of a typical two block PEM 10 according to the background art, with coordinate system shown. (For convenience, this coordinate system is also referred to below in the context of the present invention.) PEM 10 comprises an optical block 12 with an aperture 14 to transmit the light beam to be modulated, and a driving block 16 affixed thereto. The centre of the aperture 14 is positioned at the mid-point of the block 12 and corresponds to the maximum strain volume of the optical block 12. FIG. 2 is a schematic plot of the strain distribution within the optical block 12 along the X-axis. Antinodes are labelled "A" and nodes are labelled "N". FIG. 3 is a schematic plot of the transverse perturbation caused by the longitudinal standing wave induced in the optical body 12 of PEM 10. Region 32 corresponds to the nodes "N" of FIG. 2, while region 34 is the region of maximum strain corresponding to the antinodes "A" of FIG. 2.

However, this form of PEM is sensitive to variations in ambient temperature, which poses difficulties in applications outside temperature controlled laboratories. Another PEM, invented by J. C. Canit and J. Badoz (J. C. Canit and J. Badoz, Applied Optics, 22 (1983) 592), was claimed to have very high efficiency and to be less vulnerable to temperature variations. The Canit-Badoz device employs so-called "shear coupling" to achieve high efficiency, which they effect by adhering a thin slab of piezoelectric ceramic transducer to one surface of a rectangular optical element, but this creates new problems. The surface induced longitudinal acoustic standing wave that is the driving force for creating optical birefringence causes considerable unwanted vibrations and acoustic reflections. These unwanted components tend to interfere with each other and degrade the purity of the polarisation modulation. In practice, the suggested use of two piezoelectric transducers—one on the top surface and one on the bottom surface of the PEM body—has been shown to operate with low efficiency, and this design has been mentioned little in the measurement of polarisation.

FIG. 4 is a schematic view of a PEM 40 according to the Canit-Badoz approach. PEM 40 comprises a rectangular block 42 of solid material and a piezoelectric transducer 44 in the form of a flat slab adhered to one of the narrow faces of block 42, to vibrate block 42 in the Y (or transverse) direction and hence establish longitudinal standing waves extending in the X (or longitudinal) direction. The PEM 40 also comprises, adhered to the face opposite transducer 44, either a second, identical piezoelectric transducer or piezoelectric sensor 46 (which would be of comparable dimensions).

Piezoelectric transducer 44 is FIG. 5A is a view of piezoelectric transducer 44 of PEM 40. Transducer 44 has a top electrode 52a, a bottom electrode 52b, and electrical leads 54a, 54b coupled to electrodes 52a, 52b respectively.

Canit and Badoz suggested that the piezoelectric transducer 44 couples its vibration through shear action to the block 42. Although the Canit-Badoz device is effective, no experimental evidence or theoretical study has yet verified the suggested mechanism. Further, the shear coupling create considerable internal reflections together with some resonances at different acoustic frequencies; these perturb the normal longitudinal standing wave. Based on the evidence that a spectrum of acoustical resonance peaks can be obtained by sending signals of different frequencies to excite those resonances and at frequencies of some resonance peaks, suggesting a considerable amount of optical retardation. Although the frequencies are separated from the desired longitudinal frequency, it appears likely that polarisation purity is adversely—if transiently—affected. The acoustical spectrum is relatively easy to measure, but it has proved to be extremely difficult to visualise them as acoustic waves and to analysis their individual components.

A recent attempt to solve the problem of the propagation of unwanted vibration and reflections into the optical block is described in WO 06/079168, which discloses a PEM with good thermal stability while retaining the high transduction efficiency of the Canit-Badoz design. WO 06/079168 employs, in some embodiments, transducers comparable to those of the Canit-Badoz design (cf. FIG. 5A). FIG. 5B is a view of piezoelectric sensor 56 of WO 06/079168 (see FIG. 13 thereof), with electrical leads 58a, 58b, and which is narrower than the corresponding transducer in order to minimise sensitivity to longitudinal perturbations.

However, owing to the inherent limitations of the Canit-Badoz driving scheme, the PEM of WO 06/079168 also has limitations such that, for example, a two block structure remains preferable, with an optical block of smaller cross-section employed to minimise the propagation of unwanted vibration. Where a crystalline material such as calcium fluoride is used for that optical block, it is typically necessary to precisely cut the crystal along two specific crystal directions or use different material for the construction of the driver block; in the latter arrangement, the advantage of high temperature stability is lost.

SUMMARY OF THE INVENTION

According to a first aspect of the present invention, therefore, there is provided a photoelastic modulator, comprising:
  a driving block; and
  a driver transducer for perturbing the block in a predefined direction to establish a standing wave extending longitudinally in the block and hence perpendicularly to the predefined direction;
  wherein the transducer is affixed to the block at two regions of the transducer mutually displaced in the predefined direction.

Thus, longitudinal standing waves may be excited in the photoelastic modulator for the optical modulation and phase modulation of light, while reducing interfering vibration and reflections inside the modulator.

This approach attempts to separate the lengthwise extension mode of the transducer from other modes, or to at least have the lengthwise extension mode dominate, thereby minimising the unwanted effects of other modes and reflections. In an elongated rod or pipe shaped solid, transverse perturbation is induced by the longitudinal wave's propagating along the longitudinal axis; these waves are called Lamb waves.

With the isolation of the lengthwise extension mode, a single block of optical material can be used for the construction of a complete photoelastic modulator. This has the advantage of minimising the temperature sensitivity while retaining the advantages of the Canit-Badoz single optical block arrangement to avoid the precise dimensional matching in the process of building the Kemp PEM. Pure or nearly pure longitudinal standing wave mode is maintained.

The transducer may be in the form of a compound transducer or a set of transducers. In one embodiment, the transducer comprises an array of narrow strips to minimise vibration modes perpendicular to the predefined direction.

In one particular embodiment, the driving block has a recess or gap under a portion of the driver transducer, to reduce mechanical coupling of the driver transducer to the driving block in a perpendicular direction to the predefined direction.

The recess may be rectangular, but in particular embodiments is H shaped thereby having a pair of contact pads aligned in the predefined direction. A sensor may be affixed, for example, to these contact pads.

The transducer may be a piezoelectric transducer.

This arrangement minimises the induction of perturbations or vibration in other than the desired direction.

In one embodiment, the photoelastic modulator includes a sensor affixed to the block at two regions of the sensor mutually displaced in the predefined direction.

Thus, the detection of transverse perturbation (i.e. in the Y direction) is maximised, and the detection of longitudinal perturbation (i.e. in the X direction) is minimised.

In another embodiment, the photoelastic modulator includes a sensor in the form of a pressure sensing device located in the maximum pressure zone of the modulator. This may be between the driving block and the optical block (in two block embodiments). In such embodiments, a pressure sensing device (such as a semiconductor pressure sensor or a MEM sensor) may be located in a recess on either side of the junction between the blocks.

In other embodiments, the transducer is shaped to provide a gap between a portion of the transducer and the driving block, between the two regions, to reduce mechanical coupling of the driver transducer to the driving block in a perpendicular direction to the predefined direction.

In some embodiments, the photoelastic modulator is a single block photoelastic modulator. Hence, in such embodiments, the driving block is also the optical block. Thus, a photoelastic modulator can be provided on a single optical block, such as by forming a photoelastic modulator by adhering one or more transducers directly to the maximum strain zone of the block.

Alternatively, a transducer (such as a narrow strip of piezoelectric transducer) can be added at the maximum strain zone to an existing driver block. The added transducer serves as a subsidiary supplier of controlling force for the regulation of the performance of the photoelastic modulator performance.

In certain embodiments, the driving block has a plurality of driver transducers each affixed to the block at two regions of the transducer mutually displaced in the predefined direction. The driving block may have a plurality of recesses, each under a portion of respective one of the driver transducers, to reduce mechanical coupling of the respective driver transducer to the driving block in a perpendicular direction to the predefined direction.

These embodiments permit the provision of a single block PEM with symmetrical located transducers, including with— for example—half-wave blocks or full-wave blocks (and other integral multiples of half-wave), and octagonal or other non-rectangular blocks.

These embodiments can be used to suppress flexural modes in thin block or plate-like PEM bodies so that there is no excitation of such modes or of so-called anti-symmetrical modes.

According to a second aspect of the present invention, there is provided a photoelastic modulator block, comprising:

a driving block with a recess;

wherein the recess is located at a position suitable for driving the block with a driver transducer for perturbing the block in a predefined direction to establish a standing wave extending longitudinally in the block and hence perpendicularly to the predefined direction, and the recess has a size that allows the driver transducer to be affixed to the block over the recess and at two regions of the transducer mutually displaced in the predefined direction.

In one embodiment, the photoelastic modulator block is adapted for use as a single block photoelastic modulator block. Hence, in such embodiments, the driving block is also the optical block.

The two regions may be augmented with additional regions of attachment.

In certain embodiments, the block has a plurality of recesses, each located at a position suitable for driving the block with a respective driver transducer for inducing vibration in the block in a predefined direction, and each recess having a size that allows the respective driver transducer to be affixed to the block over the recess and at two regions of the transducer mutually displaced in the predefined direction.

According to a third aspect of the present invention, there is provided a photoelastic modulator, comprising:

an optical block; and a sensor for detecting vibration in the block in a predefined direction;

wherein the sensor is affixed to the block at two regions of the sensor mutually displaced in the predefined direction.

The optical block may include a recess or gap under a portion of the sensor, to reduce mechanical coupling of the sensor to the optical block in a perpendicular direction to the predefined direction.

According to a fourth aspect of the present invention, there is provided a photoelastic modulator block, comprising:

an optical block with a recess;

wherein the recess is located at a position suitable for sensing vibration in the block in a predefined direction, and the recess has a size that allows a sensor to be affixed to the block over the recess and at two regions of the sensor mutually displaced in the predefined direction.

BRIEF DESCRIPTION OF THE DRAWING

In order that the invention may be more clearly ascertained, embodiments will now be described, by way of example, with reference to the accompanying drawing, in which:

FIG. 4 is a schematic view of a background art single block Canit-Badoz PEM;

FIG. 5A is a schematic view of the background art piezoelectric transducer of the PEM of FIG. 4;

FIG. 5B is a schematic view of a background art piezoelectric sensor for a PEM;

DETAILED DESCRIPTION

Figure 6:
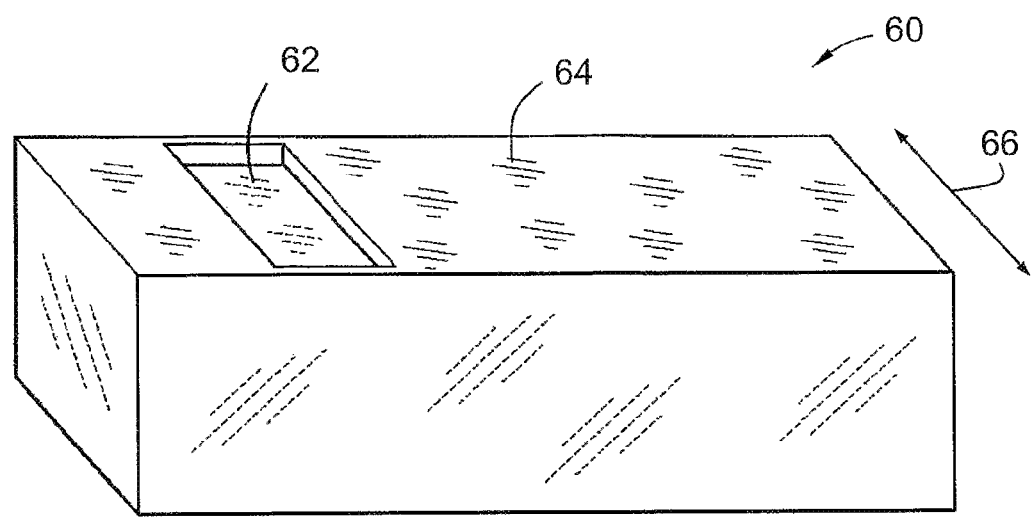
FIG. 6 is a view of a single-block full wave PEM body according to a first embodiment of the present invention.

FIG. 6 is a schematic view of a single-block full wave PEM body 60 according to a first embodiment of the present invention. The PEM body 60 comprises a solid block of optical material comprising, in this embodiment, a rectangular block of fused silica. The PEM body 60 includes a rectangular recess 62, formed by masking the upper surface 64 of PEM body 60 and removing material with a particle jet etching (i.e. essentially sand blasting) or chemical etching. Geometrically, the recess 62 is the opposite of a mesa. The size of recess 62 is less than that of the transducer to be affixed in length (i.e. in the Y direction) but wider than the transducer (i.e. in the X direction).

If the PEM body is, instead, to be used as part of a two block PEM, the material of the two blocks is preferably a solid material of the same chemical constituent. However, only the optical block is in such embodiments of high optical quality such as in spectral coverage, and with very low residual birefringence.

The recess 62 is provided so that perturbations are induced only in the transverse (or Y) direction 66 of PEM body 60, so the depth of the recess 62 may be less than a millimeter (though if a deposited amplitude sensor is to be used, further chemical treatment may be employed). In this embodiment, the depth of the recess 62 is of the order of 0.5 mm; its shape is not limited to that shown, provided a gap is provided under the transducer to minimise the effect of the transverse vibration of that transducer. In an alternative embodiment, for example, no recess is provided. Rather, the ends of the transducer are provided with feet that elevate the central portion of the transducer above the upper surface 64 of PEM block 60, or the underside of the centre of the transducer is etched to form a recess in the underside of the transducer; in both cases a gap is provided between the central portion of the transducer and the block.

Figure 7:
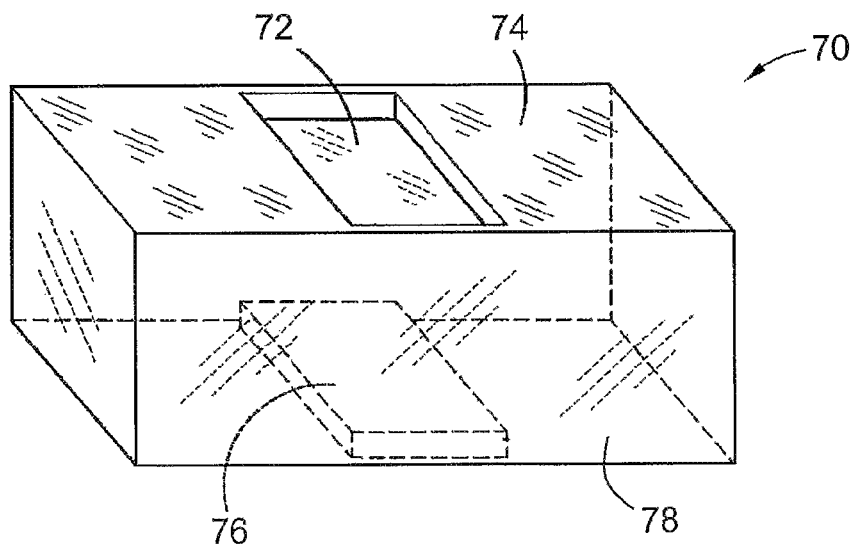
FIG. 7 is a view of a single-block PEM body adapted to work at a half-wave mode according to a second embodiment of the present invention.

FIG. 7 is a single-block half-wave mode PEM body 70 according to a second embodiment of the present invention. The PEM body 70, like PEM body 60 of FIG. 6, comprises a solid block of optical material comprising a rectangular block of fused silica. PEM body 70 includes a recess 72, comparable to recess 62 of PEM body 60 of FIG. 6, formed in upper surface 74. In addition, however, PEM body 70 includes a second recess 76 formed in bottom surface 78 of the PEM body 70.

Figure 8:
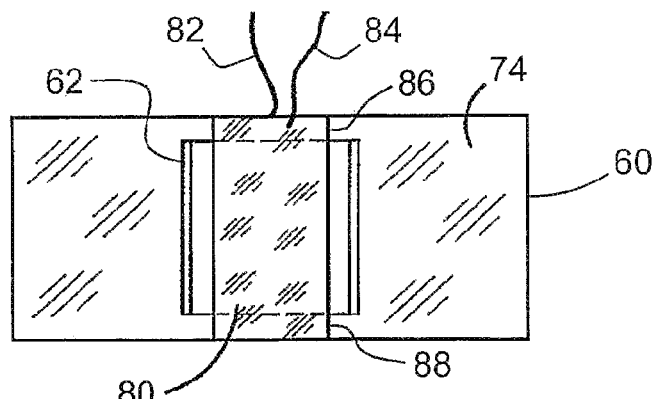
FIG. 8 is a view of the piezoelectric transducer located over the recess of the PEM body of either FIG. 7 or FIG. 8.

The ultimate PEM comprises PEM body 60 and a piezoelectric transducer (such as transducer 44 of FIGS. 4 and 5A). FIG. 8 is a schematic plan view of PEM body 60 (or equivalently PEM body 70), with a piezoelectric transducer 80 (with electrical leads 82, 84) attached thereto over recess 62. The transducer 80 can be a single slab of piezoelectric material (such as PZT-5 ceramic) but most conveniently either a number of separated narrow strips or a multiple strip array in a single piece of piezoelectric material. After the PEM's sensor (not shown) is in position and wired (see below), transducer 80 is adhered over recess 62 with a strong epoxy adhesive (of the type commonly used for affixing ultrasonic transducers).

The epoxy is applied only to the ends of the transducer 80 so that transducer 80 is adhered to two opposite portions 86, 88 (in the Y direction) of upper surface 74 of PEM body 60 adjacent to recess 62, such that the centre line of the transducer 80 coincides with the centre line of the recess 62. As is apparent from this figure, the recess 62 is wider (in the X or longitudinal direction) than transducer 80, so that transducer 80 does not touch the longitudinal edges of recess 62. This configuration essentially eliminates coupling of vibration in the X direction, minimising unwanted vibration and reflections in the PEM body 60. Thus, the interference arising in Canit-Badoz PEMs is minimised and dual transducer construction (see FIG. 7) can be implemented in a single block in a symmetrical arrangement for applications of longer optical wavelengths. The advantage of utilising recess or air gap 62 also applies to the installation of the amplitude and phase sensor.

The two ends of a strip type sensor (not shown, but comparable to sensor 56 of FIG. 5B) are adhered to the block 60 on the face opposite upper surface 74, in a similar manner, and preferably over a recess comparable to recess 62. Consequently, the sensor is largely sensitive to only transverse perturbations, that is, in the Y direction, and hence the same direction as the induced perturbations.

This arrangement of the recess and transducer makes the lengthwise extension mode the main driving mode for exciting the longitudinal standing waves in the PEM body 60,70, thus providing a way to separate the lengthwise mode from other (and unwanted) modes of vibration.

The position of the recess 62,72,76 is that at which background art piezoelectric transducers are disposed, that is, the maximum strain zone. As the recess 62,72,76 is lower than the rest of the respective block surface, and its width is larger than the width of the transducer 80, the transducer has no other contact with the surface of the solid block other than the two opposite edges to which the transducer 80 is adhered. When the transducer is driven by an external electrical signal with a proper frequency (or alternatively, in the so called auto-oscillation mode), the transducer transfers its force in the direction of the transverse perturbation to the PEM body 60,70. With the thickness polarisation of the piezoelectric transducer 80, there only lengthwise vibration is transferred to the PEM body 60,70; any lateral vibration (i.e. in the X direction) or any other vibrations of the transducer other than in the direction of the lengthwise mode has essentially no effect on the excitation of vibration of the block 60,70.

The transducer 80 preferably has a high length to width ratio (i.e. its size in the Y direction to its size in the X direction), so that little contraction in width occurs in use even where considerable extension is induced in the length of the transducer. This promotes efficiency and minimises unwanted vibration and resonances. In use, the narrow strip piezoelectric transducer limits the total driving power for the excitation of standing waves in the PEM. In principle, the demand of driving power is in proportion of the degree of required optical retardation and is inversely proportional to the working optical wavelength. In these embodiments, multiple strip transducers may be employed, arranged in parallel on the PEM body 60,70. The parallel strips form an array, and this array can comprise either several narrow strips of piezoelectric material in adhered in parallel and electrically connected together, or multiple strips deposited (or fired) on electrodes in parallel. One preferred technique is to provide the parallel array by etching a single piezoelectric ceramic element to create long, narrow areas; electrode material is then fired or deposited on to complete the electrical connection. The ridges of material that has not been etched make the transducer stronger against bending under high stress, with minimum interfering effects.

In embodiments with two transducers (such as PEM body 70 of FIG. 7), the transducers are operated in phase. With the near pure longitudinal mode, few if any interference effects are created by the two transducers.

Figure 9:
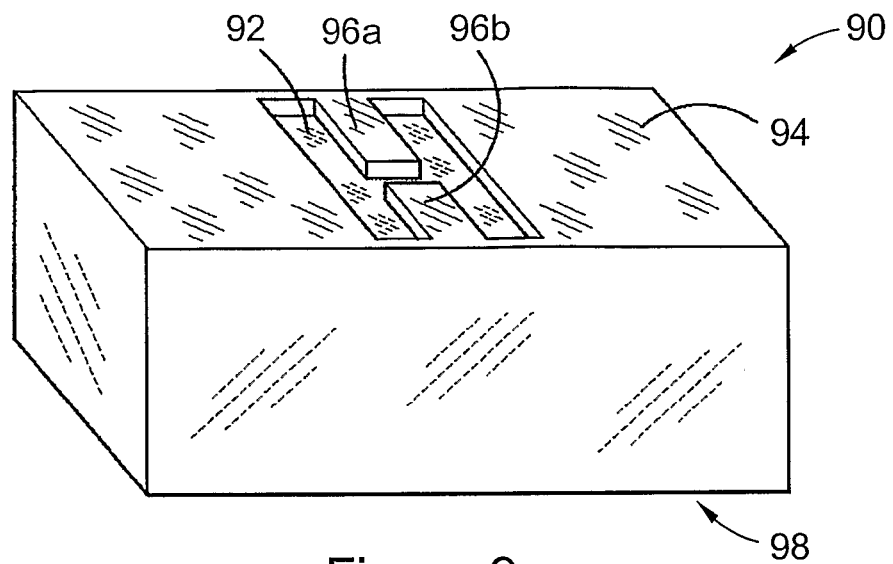
FIG. 9 is a view of a single-block PEM body with an H shaped recess according to a third embodiment of the present invention.

FIG. 9 is a schematic view of a single-block half-wave mode PEM body 90 according to a third embodiment of the present invention. The PEM body 90 comprises a solid block of optical material comprising a rectangular block of fused silica. The PEM body 90 includes an H shaped recess 92 in its upper surface 94; this shape leaves non-recess portions in the form of contact pads 96a, 96b extending inwardly towards the centre of the recess 92. These contact pads 96a, 96b provide additional contact areas for a piezoelectric transducer, and contact areas for the sensor. This provides a purely extension mode of sensing that minimises the detection of reflections inside the block 90 that might otherwise be transferred to the sensor as noise.

This embodiment of PEM body is most particularly adapted for use in high stress conditions. PEMs operating in long optical wavelengths, that is from the medium to the far-infrared optical spectral region, requires a strong strain induced birefringence to create sufficient optical retardation. In this embodiment, the edges of the transducer (not shown) that is ultimately attached to the surface of the PEM body 90 can experience very high mechanical stress and, in certain circumstances, the stress can be high enough to cause cracking in optical materials such as ZnSe. The H shaped recess 92—with extended edges 96a, 96b—still has sides (i.e. in the width or X direction) clear of the transducer. In addition, a transducer comprising a parallel narrow strip array of piezoelectric material is employed in this embodiment to minimise vibrations in the width or X direction. The strip array is produced on a single piece of a thicker piezoelectric ceramic material.

The width (i.e. in the X direction) of the recess 92 can be increased essentially as desired, and indeed multiple adjacent transducers—including sensor(s)—can be installed. Furthermore, PEM body 90 may optionally include a second, identical recess (not shown) in its bottom face 98; the provision of a second recess is beneficial but not essential.

Figure 10:
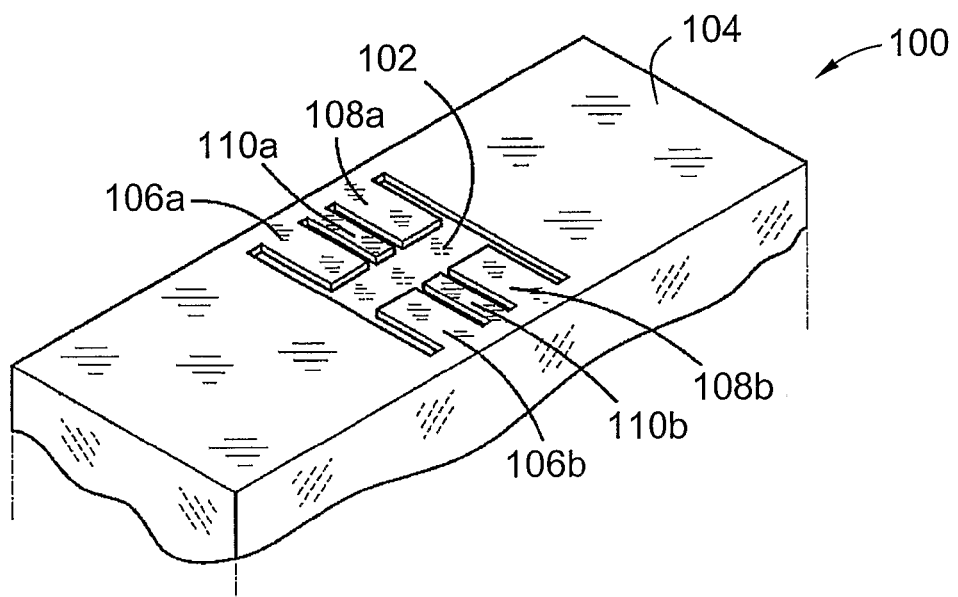
FIG. 10 is a view of a portion of a half-wave PEM body with a multiple H-shaped recess according to a fourth embodiment of the present invention.

FIG. 10 is a view of a the upper portion of a half-wave PEM body 100 according to a fourth embodiment of the present invention, with a multiple H-shaped recess 102 in its upper surface 104. PEM body 100 is comparable to PEM body 90 of FIG. 9 but, whereas recess 92 has a single pair of contact pads 96a, 96b (defining the H shape of the recess), recess 102 of PEM body 100 has three pairs of such contact pads: outer pairs of contact pads 106a,106b and 108a,108b, and inner pair of contact pads 110a,110b. Each of the inner pair of contact pads 110a,110b is narrower than the outer contact pads 106a,106b and 108a,108b, and are provided for attaching the sensor. The outer contact pads 106a,106b and 108a, 108b are provided for attaching the transducer. Further, the gaps between the respective contact pads need not be equal, though in this embodiment are equal.

It is notable that the central pads are the best position for the amplitude and phase sensor. With such an arrangement, the sensor does not response to surface displacement other than transverse perturbations.

Figure 11:
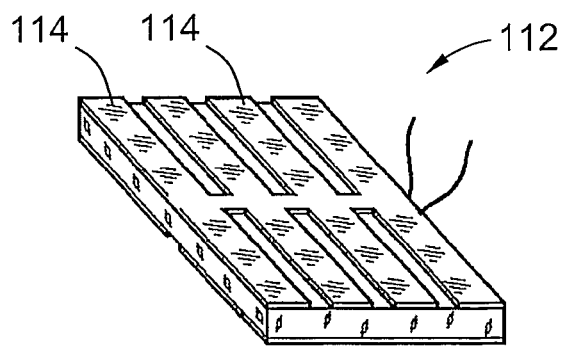
FIG. 11 is a view of multiple strip piezoelectric transducer on a single (or monolithic) piece of piezoelectric material for use in the above embodiments of the present inventions.

FIG. 11 is a view of typical piezoelectric transducer 120 for use with the above-described embodiments. Transducer 112 comprises multiple strips 114 on a single (or monolithic) piece of piezoelectric material; the strips are generally connected (as shown in this figure) but are not in all embodiments. Any suitable method of connection can be employed.

Figure 12:
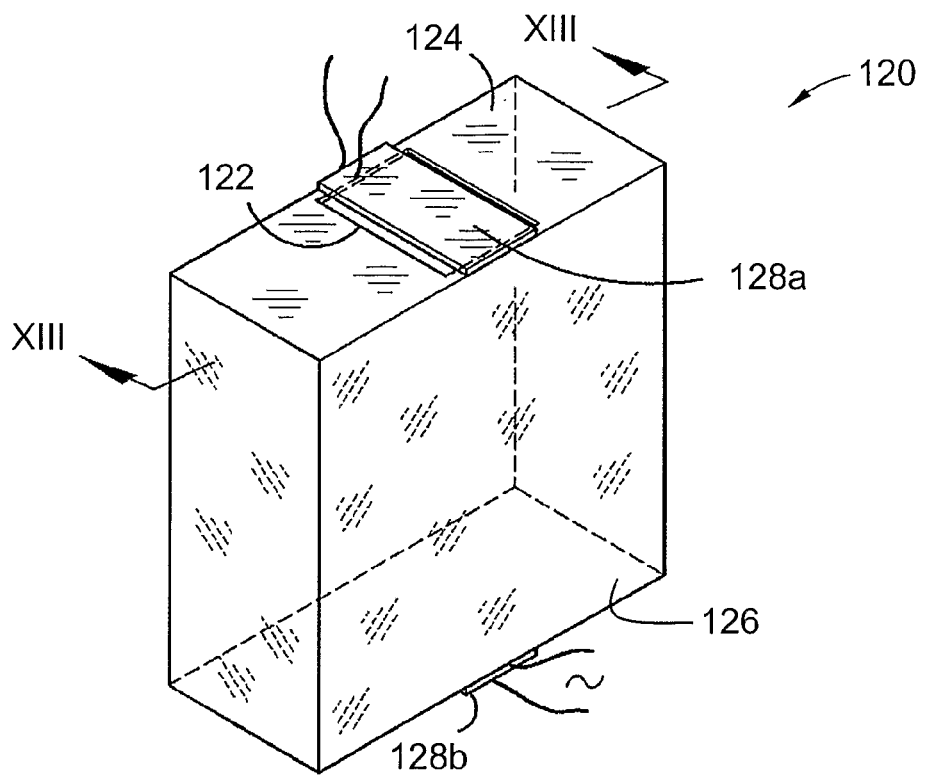
FIG. 12 is a view of a rectangular single block PEM according to a fifth embodiment of the present invention.
Figure 13:
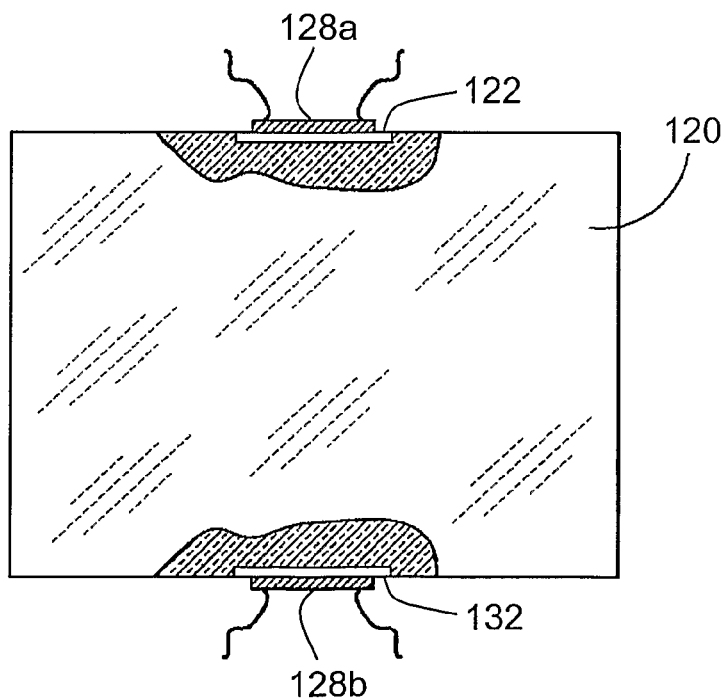
FIG. 13 is the cross-sectional view of the PEM of FIG. 12 in the direction XIII-XIII.

FIG. 12 is a schematic view of a rectangular single block PEM 120, with a first recess 122 on its upper surface 124 and a second recess (not shown) on lower surface 126. Each recess is provided with a corresponding transducer 128a, 128b. FIG. 13 is the cross-sectional view of PEM 120 of FIG. 12 in the direction XIII-XIII, showing transducers 128a, 128b and corresponding recesses 122, 132.

Figure 14:
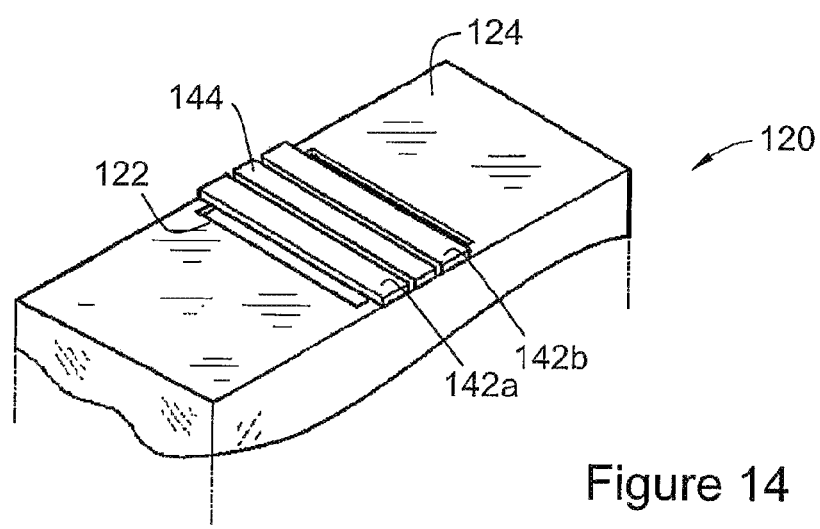
FIG. 14 is a partial view of the rectangular single block PEM of FIG. 12, provided with a two strip transducer and a sensor.

FIG. 14 is a partial view of the PEM of FIG. 12, provided with a two strip transducer 142a, 142b, and a piezoelectric sensor 144 located between the transducer strips 142a, 142b. Transducer 142a, 142b and sensor 144 are both glued at the edges of the recess 122, so that transducer 142a, 142b does not induce perturbations in the X direction and so that—even if it does—sensor 144 should pick up only perturbations in the Y direction. In addition, the transducer strips 142a, 142b and sensor 144 do not touch one another. As will be appreciated, this arrangement can also be advantageously used with the H shaped recess 92 of PEM body 90 of FIG. 9. In such an embodiment, the sensor 144 may be affixed to contact pads 96a, 96b defined by the H shaped recess.

Figure 15:
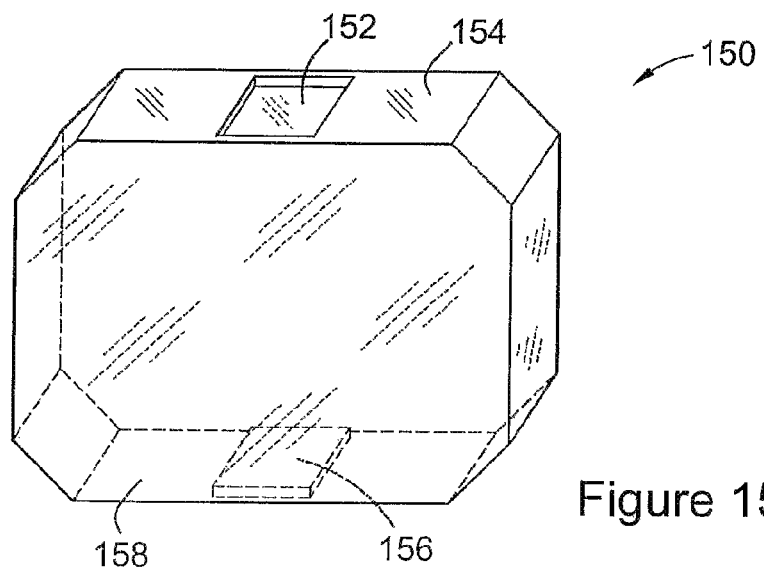
FIG. 15 is a view of an octagonal PEM body with the top and the bottom recess regions according to a sixth embodiment of the present invention (with transducers and sensor omitted)

FIG. 15 is a schematic view of an octagonal PEM body 150. PEM body 150 has a recess 152 in its upper surface 154, and an identical second recess 156 in its lower surface 158.

Although visualisation of the existence of unwanted vibrations and reflection inside either the driving or the driven (optical) block is presently impossible, the following experiment provides evidence that the method of using a recess according to this embodiment to isolate the shear coupling effect is successful.

Figure 16:
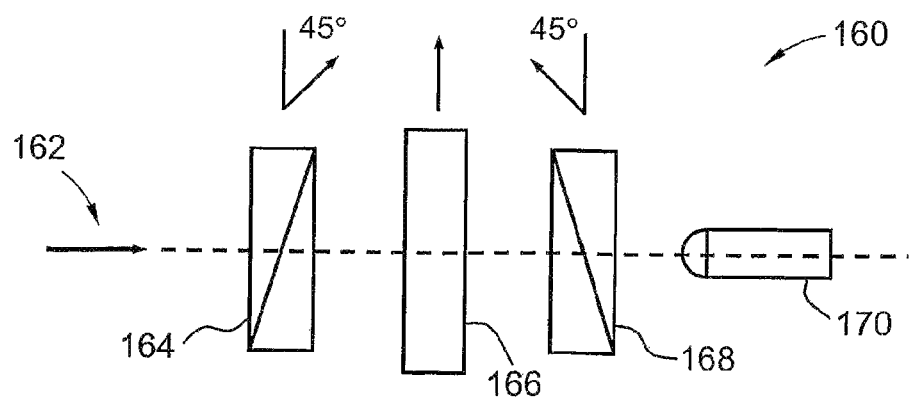
FIG. 16 is a schematic view of a crossed-polariser optical retardation test apparatus for testing the embodiments described above.

FIG. 16 is a schematic view of a crossed-polariser optical retardation test apparatus 160 for testing the two transducer embodiments described above. Monochromatic light 162 is admitted in the X direction (i.e. from the left in this view) and passes through first polariser 164, then the PEM 166. The PEM 166 has its main axis collinear with the Y-axis; the polarisation axis of first polariser 154 is at 45° to the PEM's main axis. The light 162 is then directed to second polariser 168, which is the set at −45° to PEM 166. Any light that emerges from second polariser 168 is detected by photo-detector 170. When the PEM is not activated, no light is detected by photo-detector 170.

A single block fused silica PEM body with two piezoelectric transducers (or sets of piezoelectric transducers)—such as that shown in FIGS. 12 and 13—was tested. With the arrangement shown in FIG. 16, an oscilloscope was used to monitor the output of the photo-detector 170. An electrical switching circuit was arranged in order to separate or add the effect of each transducer (cf. transducer 128a on upper surface 124 of PEM 120 and transducer 128b on lower surface 126 of PEM 120). The transducers are driven with a low output impedance electronic amplifier with an adjustable frequency source. The test procedure comprises activating the transducer on the upper surface, and adjusting and record the signal level to bring the optical retardation to about ¼ wave. Next, the transducer on the upper surface is disconnected, and the transducer on the lower surface connected; the procedure is then repeated. Finally, the two transducers are connected while maintaining the driving level unaltered. The resultant optical retardation should be at the half-wave point if the PEM is operating as expected.

The recorded optical retardation caused by both the transducer on the upper surface and the transducer on the lower surface operated simultaneously was found to equal the arithmetic sum of the two when measured separately. The estimated error was less than 3%, which is the usual error associated with an oscilloscope's display. This result may be compared with a test conducted with a PEM of the Canit-Badoz design (cf. FIG. 4), where the resultant retardation was found to be less than that produced with a single transducer.

Although the above embodiments are for use in single block PEMs, the present invention may also be employed with existing PEMs for providing a driving block (of the same material as the optical block). An independent PEM of half wave block construction, comparable to PEM body 70 of FIG. 7, can be used as a driving block to replace the quartz driving block of the background art Kemp design, to address temperature instability. When a PEM body according to the present invention is used as the driver to create optical modulation within an optical block, it need not be optically polished. As there is at least one boundary to separate the two blocks, the sensor located over the recess of the above described embodiment can be omitted and, instead, a thin pressure sensing device can be located inside the junction—in a recess provided for the sensor—between the driving block and the optical block. The sensor may be in the form of a MEM pressure sensor or a semiconductor pressure sensor.

In addition, this driving scheme replaces the abrupt junction employed in background art approaches (such as in WO 06/079168) to stop the propagation of unwanted vibration from the driving block to the optical block. The pure longitudinal wave generated by a driving block according to the present invention makes the abrupt junction unnecessary.

Thus, Kemp PEMs—which are sensitive to temperature variations—may be improved with the approach of the present invention. In the typical electronic circuitry used with PEMs, high voltage is required to drive the quartz crystal transducer, and precise compensation for optical retardation variations (mainly due to temperature changes) is difficult and often ineffective. The present invention may also be used for compensation purposes instead of power driving, and its application is not limited to the improvement of the Kemp PEMs.

Figure 1:
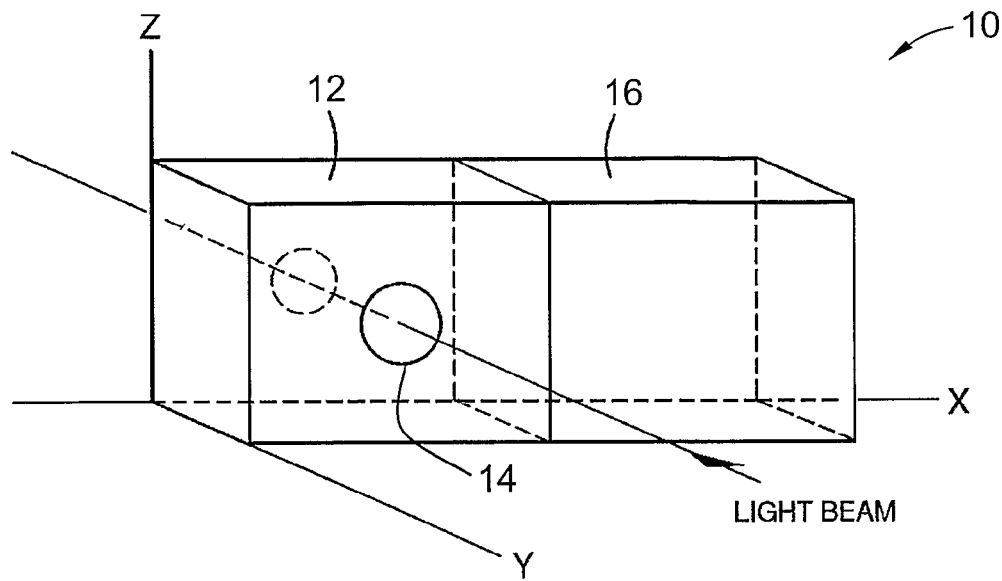
FIG. 1 is a schematic view of a typical background art two block PEM with coordinate system.
Figure 2:
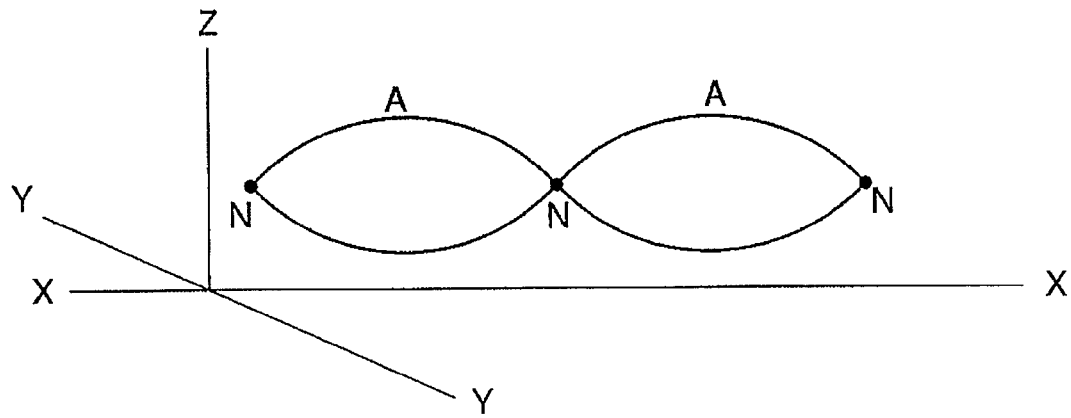
FIG. 2 is a plot of the strain distribution along the X-axis for the PEM of FIG. 1.
Figure 3:
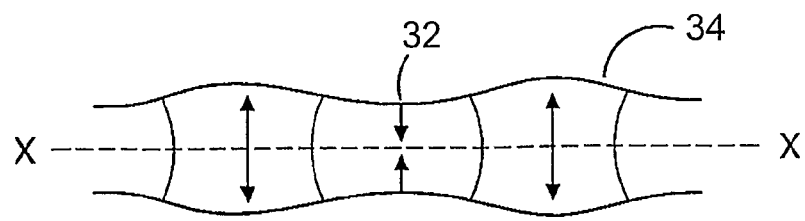
FIG. 3 is a schematic view of the transverse perturbation caused by the longitudinal standing wave built-up in the body of the two block PEM of FIG. 1.

For example, a narrow strip piezoelectric transducer driven by a signal with a precisely controlled amount of electrical power may be used to compensate for any detected amplitude error by comparing that error with a reference signal. This may be done by providing a narrow recess on the upper surface of the PEM body (i.e. in the X-Y plane, as shown in FIG. 1); this can be made on either the driving block or the optical block. A narrow strip of piezoelectric material either in ceramic form or in crystal form (such as crystal quartz) is adhered in a manner similar to that described above (cf. PEM bodies 60 and 70 of FIGS. 6 and 7) to serve as a compensation driving strip. An amplitude sensor can be installed either inside the recess or next to the compensation driving strip. The sensor can be a piezoelectric sensor working in a lengthwise mode or a strain gauge sensor provided by either vaporisation or a micro-lithographic process. The output of this sensor is send to processing electronic circuitry, which compares it to a reference signal that is indicative of the required (or ideal) experimental condition for the PEM. After electronic processing, the error signal is further amplified and sent to drive the strip transducer to compensate for error due to imperfect optical retardation. The process is repeated until there is no detectable error. This automatic feedback error correction channel is independent of the main driving electronics that carry high voltages. There should be little if any no interference between the two channels and the amount of correction is usually a small fraction of the total optical retardation.

When tested experimentally, this compensation process was found to be effective, not only for the compensation of minor temperature fluctuations in normal laboratory conditions but also for making a Kemp type PEM perform with constant efficiency over a reasonable temperature range in the laboratory environment. The narrow strip transducer has a mass in the range of tens of milligrams, and power dissipation of the strip transducer is in the milliwatt range, so the technique should be suitable with essentially all Kemp PEMs, including generic versions such as the round and octagonal PEMs for infrared applications with single or multiple quartz drivers. Furthermore, careful analysis and experimental evidence shows that, if a thin strip piezoelectric transducer is installed on a quartz block, the recess is no longer essential, and the strip can be adhered (at its ends) directly to the flat surface of the block. As the narrow strip transducer induces little lateral vibration in the quartz block and its total power is low, unwanted vibration—if any—has negligible practical effect on optical retardation, as the optical block is remote from the transducer. If very high precision control is needed, the strip of transducer can be a −18.5 degrees or +5 degrees cut quartz, to take advantage of the very good temperature stability and linearity of that material.

The phase component of the amplitude signal from the sensor on the recess can also be a good source for the synchronisation of this type of PEM, as it greatly simplifies the control electronics for two or more PEM working together in stable phase relationship, and with good stability of optical retardation. Furthermore, the sensor can also be replaced by a pressure sensing device as described above.

It is also envisaged that a composite driver with subsidiary driving transducer for the retardation correction of a completed PEM may be provided according to the present invention. This arrangement is especially important for the improvement of the traditional Kemp design with crystal quartz as the driver.

Thus, various applications and embodiments are envisaged.

1) A half-wave block with piezoelectric transducers installed on one or both faces (as in FIG. 6, 7, 8 or 9), to drive a half-wave optical block.

2) Two half-wave blocks with piezoelectric transducers for driving an optical block located therebetween.

3) Two half-wave blocks with piezoelectric transducers driving a single octagonal optical block in such a way that the two driving blocks are in line with the X axis and attached on the two opposite sides of the octagonal block.

4) A half-wave block with a monolithic piezoelectric transducer in an array form to drive a half-wave optical block, but with the transducer directly adhered on the maximum strain zone without a recess region; a well designed array transducer will cause minor unwanted vibration which will be acceptable for many applications and such an arrangement can be made as a half-standing wave driving block to drive a single optical block.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in Australia or any other country.

The invention claimed is:

1. A photoelastic modulator, comprising:
   a driving block; and
   a driver transducer for perturbing said block in a predefined direction to establish a standing wave extending longitudinally in said block and hence perpendicularly to said predefined direction;
   wherein the driving block has a recess under a portion of said driver transducer, to reduce mechanical coupling of said driver transducer to said driving block in a perpendicular direction to said predefined direction and the transducer is affixed to said block at two regions of the transducer mutually displaced in said predefined direction.

2. A photoelastic modulator as claimed in claim 1, wherein said transducer is in the form of a compound transducer or a set of transducers.

3. A photoelastic modulator as claimed in claim 1, wherein said transducer comprises an array of narrow strips to minimize vibration modes perpendicular to said predefined direction.

4. A photoelastic modulator as claimed in claim 1, wherein said recess is H shaped thereby having at least one pair of contact pads aligned in the predefined direction.

5. A photoelastic modulator as claimed in claim 4, further comprising a sensor affixed to said block at two regions of said sensor to said contact pads.

6. A photoelastic modulator as claimed in claim 1, further comprising a sensor in the form of a pressure sensing device located in a maximum pressure zone of the modulator.

7. A photoelastic modulator as claimed in claim 6, wherein said pressure sensing device is located in a recess on either side of the junction between said driving block and an optical block.

8. A photoelastic modulator as claimed in claim 1, wherein said transducer is shaped to provide a gap between said transducer and said driving block, between said two regions, to reduce mechanical coupling of said driver transducer to said driving block in the perpendicular direction to said predefined direction.

9. A photoelastic modulator as claimed in claim 1, wherein said photoelastic modulator is a single block photoelastic modulator.

10. A photoelastic modulator as claimed in claim 1, wherein said transducer is an additional transducer located at a maximum strain zone to an existing driver block.

11. A photoelastic modulator as claimed in claim 1, wherein said driving block has a plurality of driver transducers each affixed to said block at two regions of said respective transducers mutually displaced in said predefined direction.

12. A photoelastic modulator as claimed in claim 1, wherein said block is octagonal.

13. A photoelastic modulator block, comprising: a driving block with a recess; and wherein said recess is located at a position suitable for driving said block with a driver transducer for perturbing said block in a predefined direction to establish a standing wave extending longitudinally in said block and hence perpendicularly to said predefined direction, and said recess has a size that allows said driver transducer to be affixed to said block over said recess and at two regions of the transducer mutually displaced in said predefined direction.

14. A photoelastic modulator block as claimed in claim 13, wherein said photoelastic modulator block is adapted for use as a single block photoelastic modulator block.

15. A photoelastic modulator block as claimed in claim 13, wherein said two regions are augmented with additional regions of attachment.

16. A photoelastic modulator block as claimed in claim 13, further comprising a plurality of recesses, each located at a position suitable for driving said block with a respective driver transducer for inducing vibration in said block in the predefined direction, and each recess having a size that allows said respective driver transducer to be affixed to said block over said recess and at two regions of the transducer mutually displaced in said predefined direction.

17. A photoelastic modulator, comprising: an optical block with a recess; and a sensor for detecting perturbations in said block in a predefined direction; wherein the sensor is affixed to said block at two regions of the sensor mutually displaced in said predefined direction and extends over a portion of the recess to reduce mechanical coupling of the sensor to the optical block in a perpendicular direction to the predefined direction.

18. A photoelastic modulator block, comprising: an optical block with a recess; wherein said recess is located at a position suitable for sensing vibration in said block in a predefined direction, and said recess has a size that allows a sensor to be affixed to said block over said recess and at two regions of the sensor mutually displaced in said predefined direction.

* * * * *